(12) United States Patent
Benjamini et al.

(10) Patent No.: US 11,287,842 B2
(45) Date of Patent: *Mar. 29, 2022

(54) TIME SYNCHRONIZATION FOR CLOCKS SEPARATED BY A COMMUNICATION LINK

(71) Applicant: QUALCOMM Incorporated, San Diego, CA (US)

(72) Inventors: Yiftach Benjamini, Givat Ela (IL); Amit Gil, Zichron Yaakov (IL); Shaul Yohai Yifrach, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,657

(22) Filed: Jul. 13, 2020

(65) Prior Publication Data

US 2020/0341506 A1 Oct. 29, 2020

Related U.S. Application Data

(63) Continuation of application No. 15/966,077, filed on Apr. 30, 2018, now Pat. No. 10,795,400.

(51) Int. Cl.
*G06F 1/12* (2006.01)
*G06F 13/42* (2006.01)

(52) U.S. Cl.
CPC ............ *G06F 1/12* (2013.01); *G06F 13/4282* (2013.01); *G06F 2213/0026* (2013.01)

(58) Field of Classification Search
CPC . G06F 1/12; G06F 13/4282; G06F 2213/0026
See application file for complete search history.

(56) References Cited

U.S. PATENT DOCUMENTS 9,760,114 B1 9/2017 Gopalakrishnan
2009/0296740 A1 12/2009 Wagh et al.
(Continued)

FOREIGN PATENT DOCUMENTS

JP 2011071579 A 4/2011

OTHER PUBLICATIONS

Author Unknown, "PCI Express® Base Specification," Revision 3.0, Nov. 10, 2010, PCI-SIG, accessible at http://pcisig.com/, 7 pages.
(Continued)

*Primary Examiner* — Stefan Stoynov
(74) *Attorney, Agent, or Firm* — W&T/Qualcomm (57) ABSTRACT

Systems and methods for time synchronization for clocks separated by a communication link allow a master clock to be positioned at a downstream-facing port or an upstream-facing port and to send synchronization commands with an associated time stamp embedded in transport layer protocol (TLP) prefixes to a slave clock. The slave clock may update its time value based on the received time stamp. Further, the slave may calculate a round trip delay between the master clock and the slave clock and use this delay calculation to correct the slave clock. The delay calculation may likewise be made using TLP prefixes. By using TLP prefixes in this fashion, the time synchronization can piggyback on existing message traffic, which reduces signaling overhead. Likewise, by using the TLP prefixes, the time synchronization may be initiated from either an upstream-facing port or a downstream-facing port.

19 Claims, 9 Drawing Sheets

(56) References Cited

U.S. PATENT DOCUMENTS

| | | |
|---|---|---|
| 2010/0098111 A1 | 4/2010 | Sun et al. |
| 2010/0329285 A1 | 12/2010 | Stanton et al. |
| 2012/0284434 A1 | 11/2012 | Warren et al. |
| 2013/0346655 A1 | 12/2013 | Glaser |
| 2014/0071982 A1 | 3/2014 | Chandhoke et al. |
| 2015/0317273 A1 | 11/2015 | Errickson et al. |
| 2017/0177528 A1 | 6/2017 | Harriman et al. |
| 2019/0332137 A1 | 10/2019 | Benjamini et al. |

OTHER PUBLICATIONS

Author Unknown, "Precision Time Measurement (PTM)," PCI-SIG Engineering Change Notice, Revision 1.0a, Mar. 31, 2013, 21 pages.

International Search Report and Written Opinion for International Patent Application No. PCT/US2019/021127, dated May 17, 2019, 13 pages.

TIME SYNCHRONIZATION FOR CLOCKS SEPARATED BY A COMMUNICATION LINK

PRIORITY APPLICATION

The present application is a continuation of and claims priority to U.S. patent application Ser. No. 15/966,077, filed Apr. 30, 2018 and entitled "TIME SYNCHRONIZATION FOR CLOCKS SEPARATED BY A COMMUNICATION LINK," now U.S. Pat. No. 10,795,400, which is incorporated herein by reference in its entirety.

BACKGROUND

I. Field of the Disclosure

The technology of the disclosure relates generally to timing synchronization between integrated circuits (ICs) that are interconnected by a communication link and, more particularly, to ICs that are interconnected by a Peripheral Component Interconnect (PCI) express (PCIE) protocol.

II. Background

Computing devices have evolved from their early forms that were large and had limited use into compact, multifunction, multimedia devices. The increase in functionality has come, in part, as a function of using integrated circuits (ICs) having increasing numbers of transistors in increasingly smaller packages. Many computing devices include multiple ICs having different dedicated functions.

To improve functionality, various internal buses may be used to exchange instructions and data between the ICs of a computing device. Exemplary communication buses include, but are not limited to, Inter-integrated circuit (I2C), serial AT attachment (SATA), serial peripheral interface (SPI), or other serial interfaces. One popular bus, although it may more properly be thought of as a link in that it is a point-to-point connection (as opposed to a point-to-multipoint or multipoint-to-multipoint as implied by a bus), is based on the Peripheral Component Interconnect (PCI) express (PCIE) standard published by the PCI Special interest Group (PCI-SIG). PCIE is a high-speed point-to-point serial link. PCIE version 4 was officially announced on Jun. 8, 2017 and version 5 has been preliminary proposed at least as early as June 2017 with expected release in 2019.

PCIE has great flexibility in the types of data that may cross a PCIE One popular data type is an audio stream. To make sure the audio quality meets a desired threshold, clocks in both an upstream side and a downstream side should be synchronized. Other functions or data streams may also necessitate synchronized clocks. Current flavors of PCIE use precision time measurement (PTM) techniques to help ensure the clocks are synchronized. However, PTM techniques require that a master clock be positioned behind a downstream-facing (i.e., away from the root complex) port of the link. There are topologies where the master clock is behind an upstream-facing (i.e., towards the root complex) port of the link (e.g., an application processor-to-modem link, where the master clock is in the modem, but the modem is an endpoint, not a root complex), making PTM undesirable. Additionally, PTM may impose a signaling overhead that negatively impacts performance. Accordingly, there is a need for alternate time synchronization techniques.

SUMMARY OF THE DISCLOSURE

Aspects disclosed in the detailed description include systems and methods for providing time synchronization for clocks separated by a communication link. In an exemplary aspect, the communication link is a Peripheral Component Interconnect (PCI) express (PCIE) link. A master clock may be positioned at a downstream-facing port or an upstream-facing port and may send synchronization commands with an associated time stamp embedded in transport layer protocol (TLP) prefixes to a slave clock. The slave clock may update its time value based on the received time stamp. Further, the slave may calculate a round trip delay between the master clock and the slave clock and use this delay calculation to correct the slave clock. The delay calculation may likewise be made using TLP prefixes. By using TLP prefixes in this fashion, the time synchronization can piggyback on existing message traffic, which reduces signaling overhead. Likewise, by using the TLP prefixes, the time synchronization may be initiated from either an upstream-facing port or a downstream-facing port.

In this regard in one aspect, a method of synchronizing a clock across a communication link is disclosed. The method includes sending a synchronization command from a master through a PCIE link to a slave. The synchronization command includes a packet prefix, and the packet prefix contains a master clock time stamp.

In another aspect, a master device is disclosed. The master device includes a link interface configured to couple to a PCIE link. The master device also includes a master clock. The master device also includes a control system operatively coupled to the link interface and the master clock. The control system is configured to send a synchronization command to a slave through the PCIE link. The synchronization command includes a packet prefix, and the packet prefix contains a master clock time stamp.

In another aspect, a slave device is disclosed. The slave device includes a link interface configured to couple to a PCIE link. The slave device also includes a slave clock. The slave device also includes a control system operatively coupled to the link interface and the slave clock. The control system is configured to receive a synchronization command from a master through the PCIE link. The synchronization command includes a packet prefix, and the packet prefix contains a master clock time stamp.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for providing time synchronization for clocks separated by a communication link. In an exemplary aspect, the communication link is a Peripheral Component interconnect (PCI) express (PCIE) link. A master clock may be positioned at a downstream-facing port or an upstream-facing port and may send synchronization commands with an associated time stamp embedded in transport layer protocol (TLP) prefixes to a slave clock. The slave clock may update its time value based on the received time stamp. Further, the slave may calculate a round trip delay between the master clock and the slave clock and use this delay calculation to correct the slave clock. The delay calculation may likewise be made using TLP prefixes. By using TLP prefixes in this fashion, the time synchronization can piggyback on existing message traffic, which reduces signaling overhead. Likewise, by using the TLP prefixes, the time synchronization may be initiated from either an upstream-facing port or a downstream-facing port.

Figure 1:
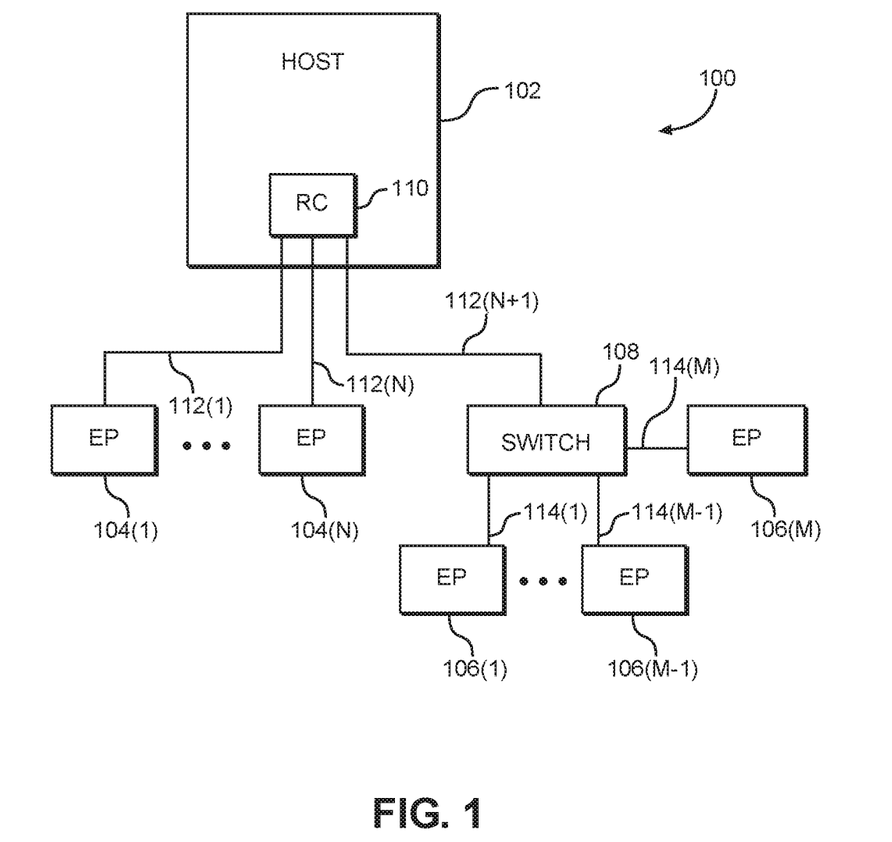
FIG. 1 is a block diagram of an exemplary computing system with devices coupled by Peripheral Component Interconnect (PCI) express (PCIE) links.
Figure 2:
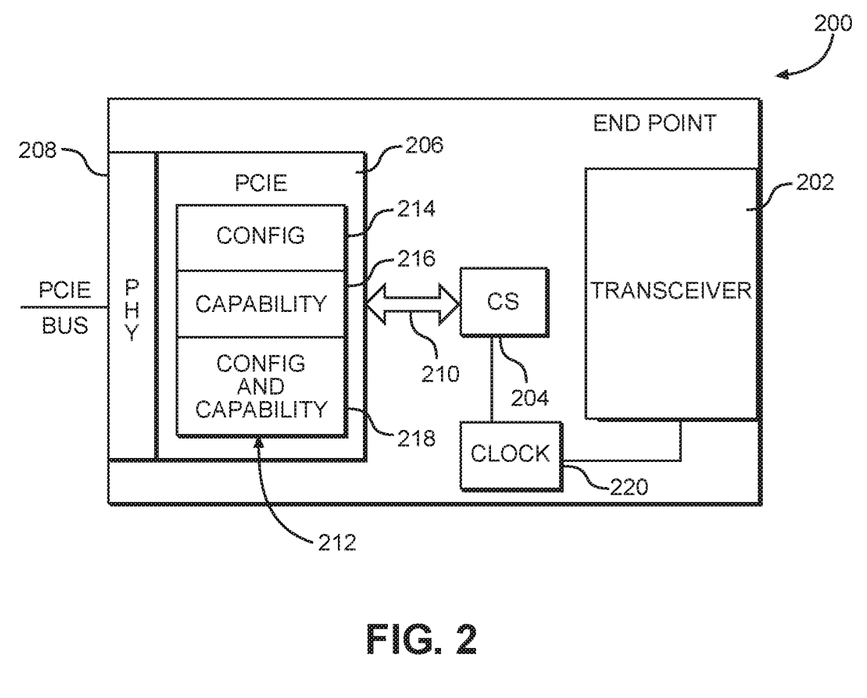
FIG. 2 illustrates a block diagram of an exemplary PCIE endpoint device, which may also be referred to as an upstream-facing device.
Figure 3:
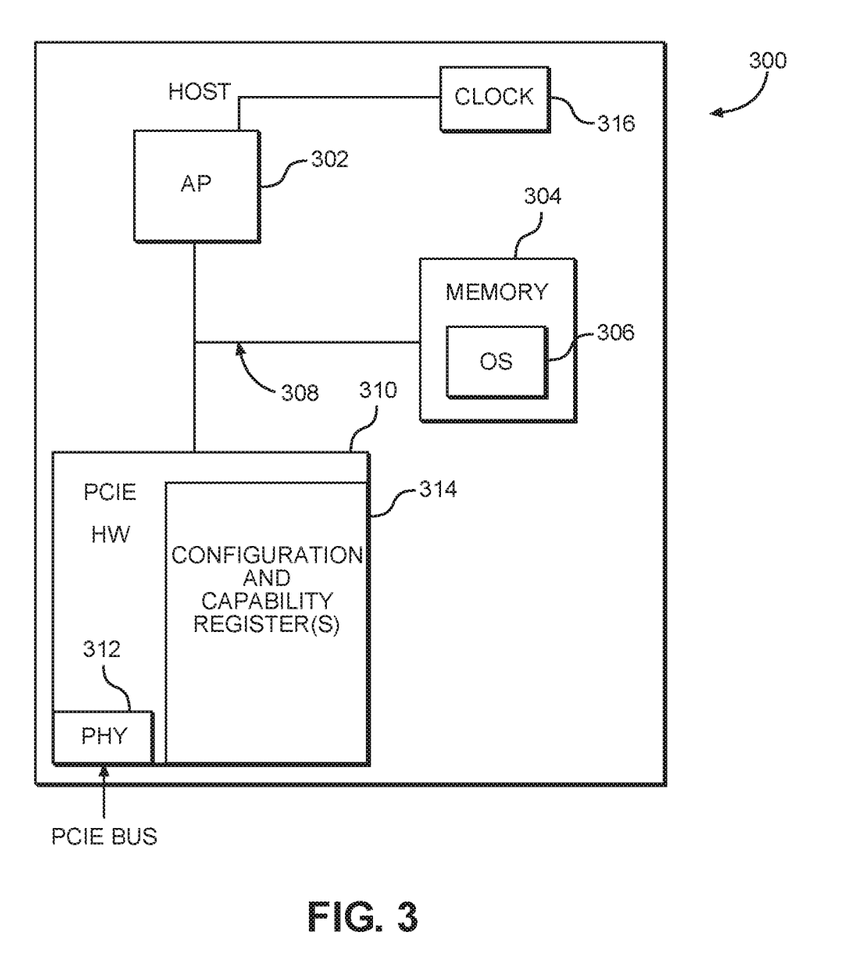
FIG. 3 illustrates a block diagram of an exemplary host having a PCIE root complex, which may also be referred to as a downstream-facing device.
Figure 4:
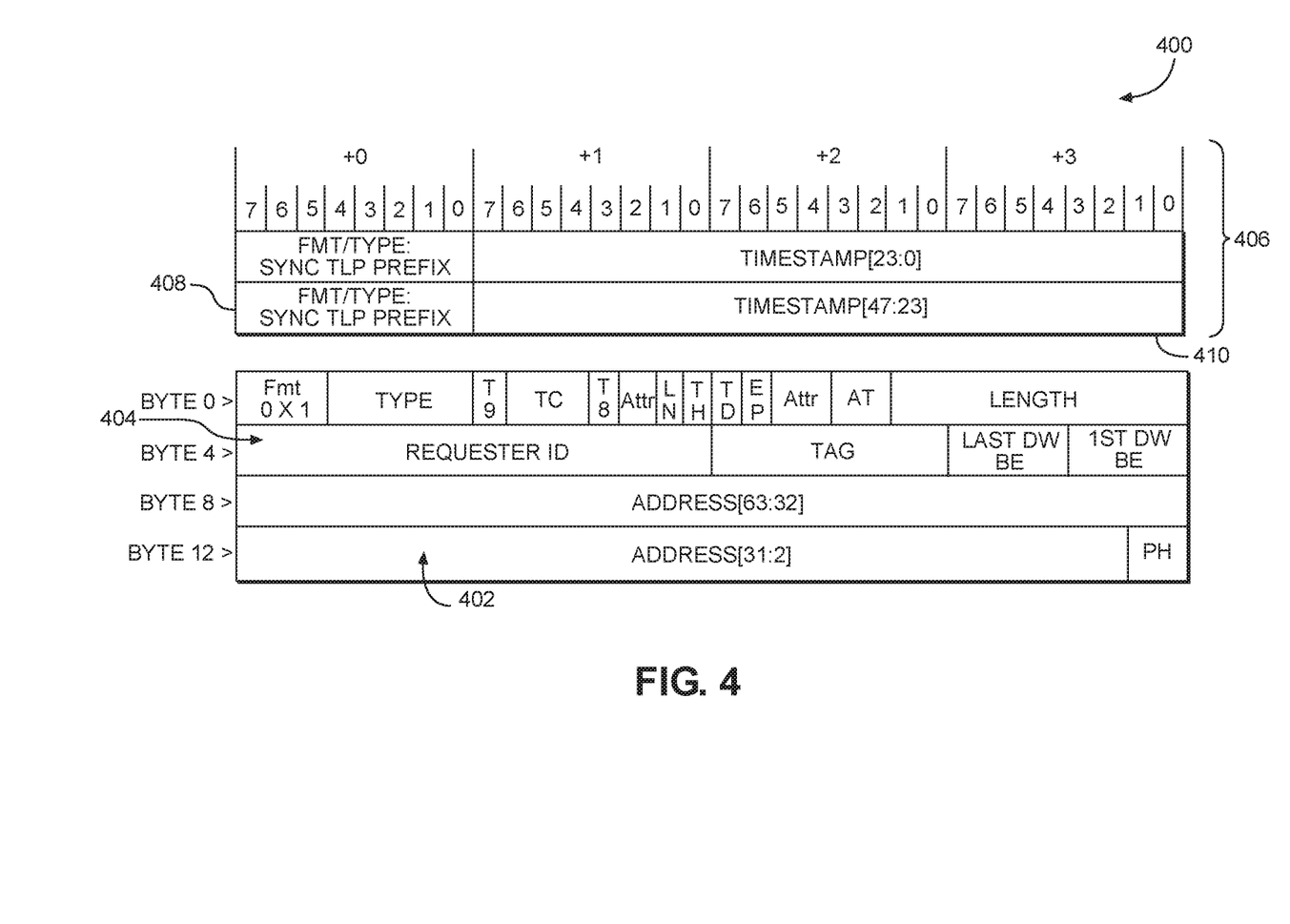
FIG. 4 illustrates an exemplary transport layer protocol (TLP) PCIE frame with TLP headers prepended thereto.

To assist in understanding aspects of the present disclosure, an overview of a PCIE environment is provided with reference to FIGS. 1-3. An exemplary frame having a TLP prefix that may include time synchronization commands and time stamp information prepended thereto is illustrated in FIG. 4. An exemplary process showing use of TLP prefixes to send time synchronization commands and time stamps according to the present disclosure is discussed with reference to FIG. 5 below with signal flow diagrams provided with reference to FIGS. 6 and 7.

In this regard, FIG. 1 illustrates a computing environment 100 with a host 102 coupled to a plurality of devices 104(1)-104(N) directly and to a second plurality of devices 106(1)-106(M) through a switch 108. In some literature, a switch such as the switch 108 may be referred to as a bridge. The host 102 may include a PCIE root complex 110 (labeled RC in FIG. 1) that includes a link interface (not illustrated directly) that is configured to couple to plural PCIE links 112(1)-112(N+1), The link interface may sometimes be referred to as a port, and ports that face away from the root complex are referred to as downstream-facing ports (hereinafter just downstream port). The switch 108 communicates to the devices 106(1)-106(M) through PCIE links 114(1)-114(M). The devices 104(1)-104(N) and 106(1)-106(M) may be or may include PCIE endpoints. In a first exemplary aspect, the computing environment 100 may be a single computing device such as a computer with the host 102 being a central processing unit (CPU) and the devices 104(1)-104(N) and 106(1)-106(M) being internal components such as hard drives, disk drives, or the like. In a second exemplary aspect, the computing environment 100 may be a computing device where the host 102 is an integrated circuit (IC) such as an application processor on a circuit board, and the devices 104(1)-104(N) and 106(1)-106(M) are other ICs such as memory elements, modems, or the like within the computing device. In a third exemplary aspect, the computing environment 100 may be a computing device having an internal host 102 coupled to external devices 104(1)-104(N) and 106(1)-106(M) such as a server coupled to one or more external memory drives. Note that these aspects are not necessarily mutually exclusive in that different ones of the devices may be ICs, internal, or external relative to a single host 102.

FIG. 2 provides a block diagram of a device 200 that may be one of the devices 104(1)-104(N) or the devices 106(1)-106(M), In particular, the device 200 acts as an endpoint in a PCIE system, and may be, for example, a modem that includes a transceiver 202 and a control system 204 (labeled CS in FIG. 2). Further, the device 200 includes a PCIE hardware element 206 that includes a link interface configured to couple to a PCIE link. The link interface of the device 200 may also be considered a port and, in particular, an upstream-facing port (hereinafter referred to simply as an upstream port). The PCIE hardware element 206 may include a physical layer (PHY) 208 that is, or works with, the link interface to communicate over the PCIE link. The control system 204 communicates with the PCIE hardware element 206 through a system link 210. The PCIE hardware element 206 may further include a plurality of registers 212. The registers 212 may be conceptually separated into configuration registers 214 and capability registers 216. The configuration registers 214 and the capability registers 216 are defined by the original PCI standard, and more recent devices that include the registers 214 and 216 are backward compatible with legacy devices. The configuration registers 214 include sixteen (16) double words (DWs). The capability registers 216 include forty-eight (48) DWs. The PCIE standard further defines additional registers found in a PCIE extended configuration register space 218. These registers did not exist in the original PCI standard, and thus, PCI legacy devices generally do not address these extra registers. The extended configuration register space 218 may be another 960 DWs. The device 200 may further include a clock 220 that interoperates with the transceiver 202 or other elements within the device 200 as needed or desired. Exemplary aspects of the present disclosure may store an indication that the device 200 is capable of performing the processes of the present disclosure in a register within the extended configuration register space 218.

Similarly, FIG. 3 illustrates a host 300 which may be the host 102 of FIG. 1. The host 300 may include an application processor 302 or other processor core which communicates with a memory element 304 having an operating system 306 operating therewith. A system bus 308 interconnects the application processor 302 with the memory element 304 and a PCIE hardware circuit 310. The PCIE hardware circuit 310 may be a PCIE root complex and may include a PHY 312 that works with or is a link interface configured to couple to a PCIE link. The PCIE hardware circuit 310 further includes a plurality of configuration and capability registers 314 that store data related to capabilities of endpoints and any configuration details. The host 300 may further include a clock 316 that interoperates with the application processor 302 or other elements within the host 300 as needed or desired.

As noted above, the PCIE standard relies on TLP frames to communicate across a PCIE link such as the PC LE links 112(1)-112(N+1) of FIG. 1, Exemplary aspects of the present disclosure allow for time synchronization information to be exchanged independently of where the master clock is located. That is, unlike precision time measurement (PTM) techniques, which restrict the master clock to being behind the downstream port, exemplary aspects of the present disclosure allow the master clock to be positioned either in a root complex or an endpoint. The ability to position the master clock at either the root complex or the endpoint provides greater flexibility for designers and in turn allows different and potentially more efficient circuit topologies to be implemented. For example, the master clock for an audio stream may be located in a modem. Exemplary aspects of the present disclosure use a TLP prefix prepended to a TLP frame to exchange time synchronization commands and time stamp information. By using TLP prefixes in this manner, signaling overhead between the root complex and the endpoint may be reduced relative to the PTM techniques set forth in the PCIE standard. To provide this exchange of time synchronization information, exemplary aspects of the present disclosure define three new types of prefixes: sync, delay, and correction, explained in greater detail below.

PCIE frames and generic TLP prefixes are well understood by virtue of their inclusion the PCIE standard. However, for the sake of illustration, an exemplary PCIE frame 400 is illustrated in FIG. 4. The PCIE frame 400 includes an address field 402, a requester identifier field 404, and other information as is well understood. The PCIE frame 400 may include an address for data associated with a read command or provide data to be written associated with a write command or the like. A TLP prefix 406 includes a prefix type field 408, which may use a reserved code to designate the TLP prefix 406 as one of the new types of prefixes defined by the present disclosure. The TLP prefix 406 may further include a timestamp field 410, which may be, for example, forty-eight (48) bits of information representing a timestamp being sent between devices according to an exemplary aspect of the present disclosure. The TLP prefix 406 is limited to three bytes of data, so if additional data is required to convey the timestamp information, additional TLP prefixes may be used. The use of multiple TLP prefixes to convey a single block of data greater than three bytes is contemplated by the PCIE standard.

Figure 5:
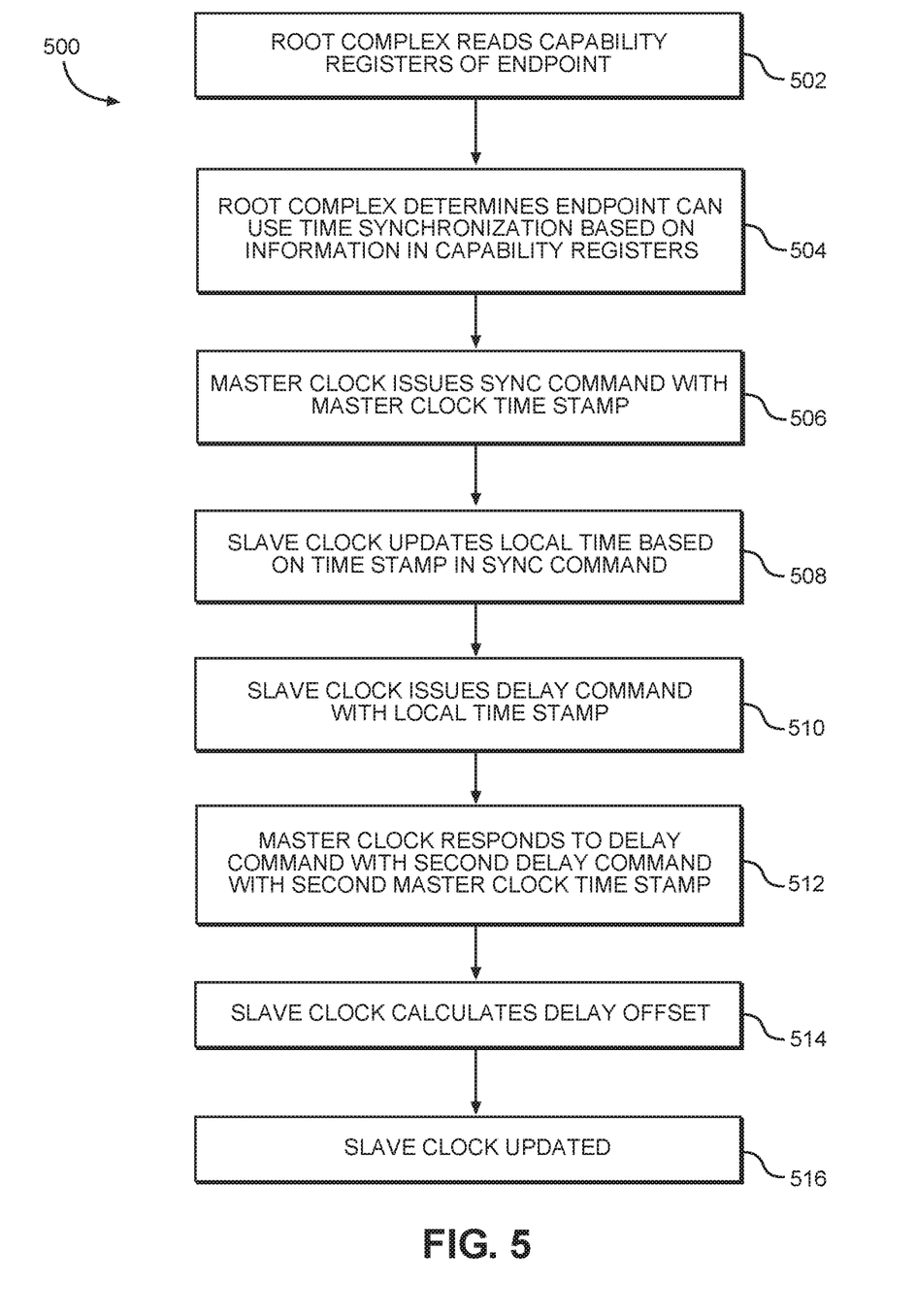
FIG. 5 is a flowchart illustrating an exemplary process for synchronizing clocks across a PCIE link using exemplary aspects of the present disclosure.

Against the backdrop of FIGS. 1-4, an exemplary process 500 for synchronizing clocks is provided with reference to FIG. 5. In particular, the process 500 begins with a root complex, such as the PCIE hardware circuit 310, reading the capability registers 214, 216, and 218 of an endpoint, such as the device 200 (block 502). The root complex determines that a given endpoint can use the time synchronization techniques of the present disclosure based on information in the capability registers (block 504). A master clock, which may be in either the root complex or the endpoint (i.e., the clock 220 or 316) is operational. An associated slave clock may need to be synchronized with the master clock, or the master clock may, determine that any slave clocks should be synchronized. Note that this determination may be a periodic synchronization that occurs independently of whether the slave actually has lost synchronization, based on some interrupt from the slave, at start up, or other trigger event as needed or desired. The PCIE hardware associated with the master clock issues a sync command with a time stamp from the master clock (block 506). The slave clock updates a local time based on the time stamp in the sync command (block 508).

It should be appreciated that there is a delay between the time that the master sends the sync command and receipt thereof by the slave clock. Accordingly, the computing system may cause the slave clock to apply a delay correction. The PCIE hardware associated with the slave clock may then issue a delay command with (or without) a local time stamp (block 510). The master clock (or more properly the PCIE hardware associated with the master clock) responds to the delay command with a second delay command having a second master clock time stamp (block 512). Based on the time that the second delay command was received (t3) relative to the time the first delay command was sent (t1), the PCIE hardware associated with the slave clock calculates a delay offset (block 514). In an exemplary aspect, the delay offset is equal to:

$$\frac{t3-t1}{2}.$$

The slave clock may be updated by the calculated delay offset (block 516) immediately or after the next sync command is received. Note further that while shown as including time stamps in both the first and second delay commands, the time stamps may be omitted, which may help reduce signaling overhead. However, by including time stamp information or other identifying information, it may be possible to link a particular second delay command to a particular first delay command. Such linkage may be appropriate if multiple delay commands may be pending at a given time.

Figure 6:
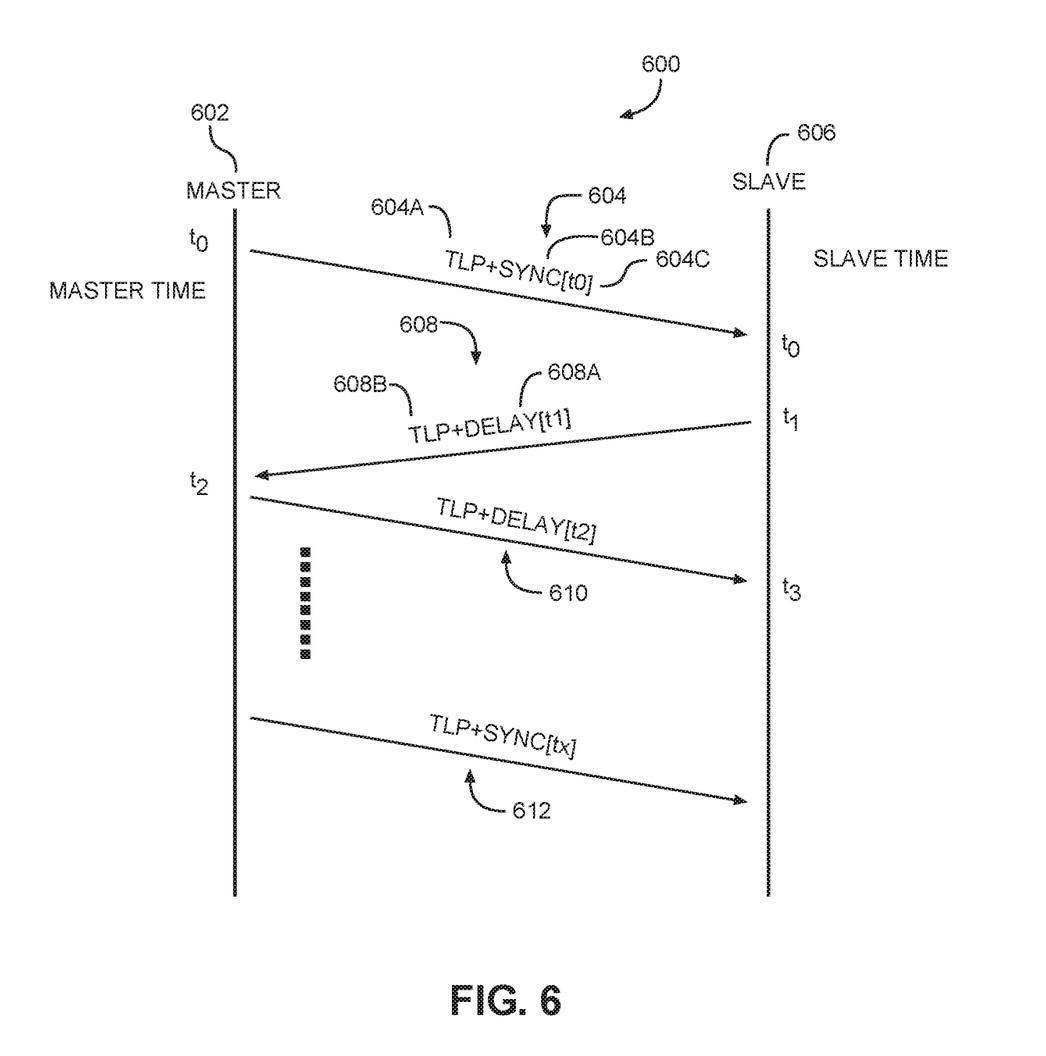
FIG. 6 is a first signal flow diagram showing calculation of a delay across a first PCIE link.

A signal flow diagram 600 of the process 500 is provided in FIG. 6. In particular, a master 602 having a master clock sends a packet 604 to a slave 606 having a slave clock at time t0. The packet 604 has a TLP portion 604A and a prefix portion 604B containing a time stamp 604C within the sync command in the prefix portion 604B. As explained above, the slave 606 updates the slave clock with the time stamp information in the packet 604. At time t1, the slave 606 sends a delay command 608A attached to a TLP portion 608B in a packet 608. Note that the delay command 608A may (or may not) have time stamp information therein. At time t2, the delay command is received at the master 602, which responds by sending a second delay command 610. The second delay command 610 is, as explained above, a TLP prefix prepended to a TLP packet. The second delay command 610 may (or may not) have time stamp information therein. The second delay command 610 is received at the slave 606 at time t3. The slave 606 may then calculate the delay offset based on the difference between t3 and t1 as noted above (i.e., the delay offset is equal to:

$$\frac{t3-t1}{2}\Big).$$

At some further point in time, the master 602 may send a subsequent sync command 612, and the slave may adjust the slave clock based on the time stamp in the sync command and the calculated delay offset.

Note that the timing of the sync commands may be done periodically, based on temperature changes, or other trigger events. In an exemplary aspect, the sync command may be sent based on an empirically derived drift. That is, a rate of drift between the clocks may be calculated and the sync command sent when the drift exceeds a predefined threshold.

Figure 7:
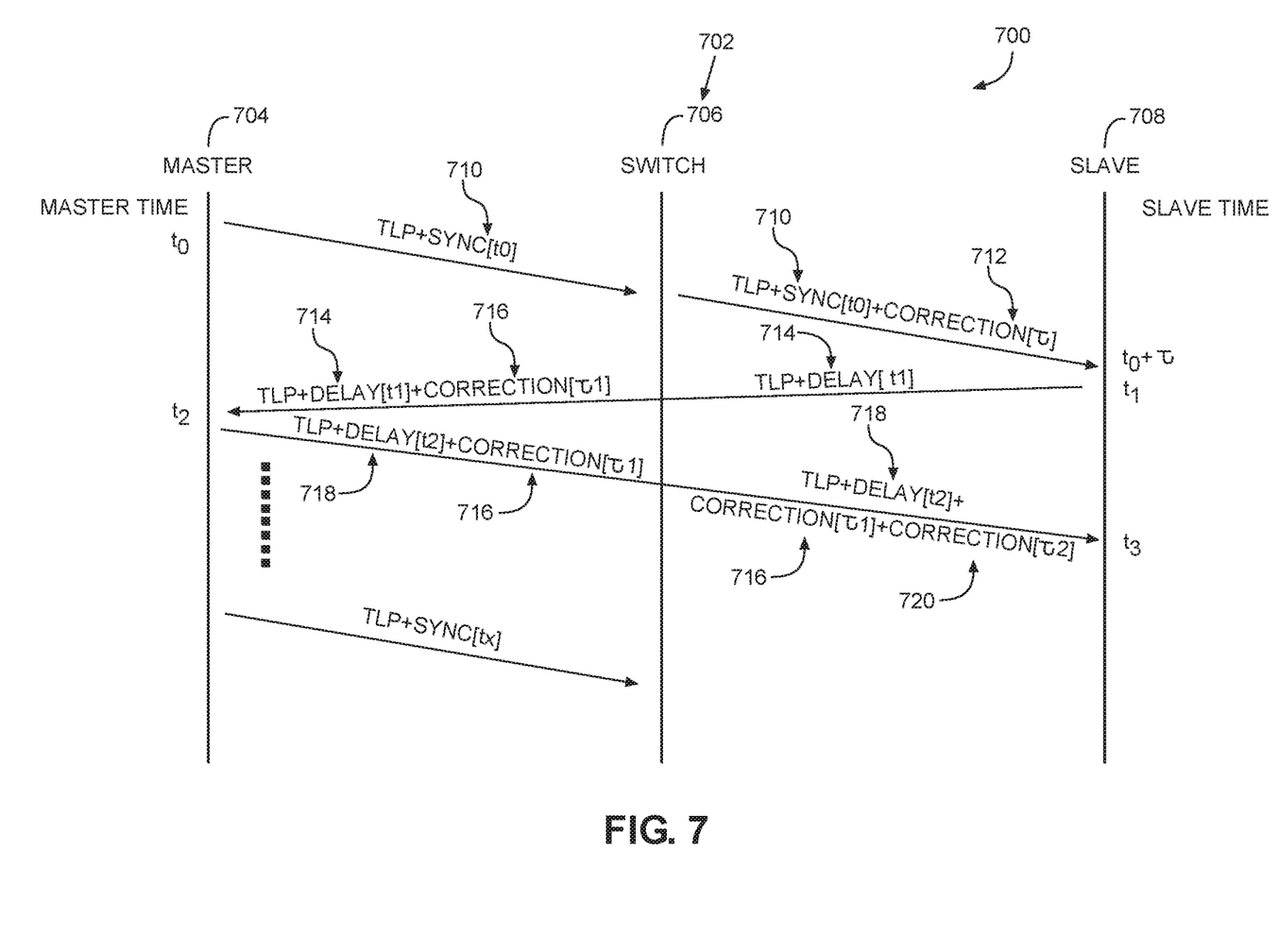
FIG. 7 is a second signal flow diagram showing calculation of a delay across a PCIE link that includes a bridge.

While the sync and delay commands are adequate for a direct link between a master and a slave, it should be appreciated that there are topologies where there is a bridge or switch interposed between the master and the slave. In such cases, it may be necessary to adjust a time synchronization by a non-deterministic value associated with a delay caused by the switch or bridge. An exemplary signal flow diagram 700 is provided in FIG. 7 illustrating the use of a correction command to address such situations for a computing environment 702. In this regard, the computing environment 702 includes a master 704, a switch 706, and a slave 708. The master 704 may send out a sync command 710 to the slave 708. The sync command 710 passes through the switch 706. The switch 706, on receipt of the sync command 710, determines how much time passes between receipt of the sync command 710 at its ingress port and transmission of the sync command 710 at its egress port and appends a correction command 712 to the sync command 710. The correction command 712 includes a value TO corresponding to the amount of time determined by the switch 706. The correction command 712 may be a TLP prefix. The slave 708 may set the slave clock to time t0 from the sync command or may set the slave clock to time t0+τ0. As before, at some later time τ1, the slave 708 may initiate a delay command 714 to calculate a round trip delay. The delay command 714 arrives at the switch 706 and is passed therethrough with a correction command 716 added. The correction command 716 may include a correction value τ1. The master 704 may respond with a delay command 718 with the correction command 716 added. The delay command 718 is received by the switch 706 and passed to the slave 708 with an additional correction command 720 added. The additional correction command 720 may include a second correction value τ2. The slave 708 may subtract τ1 and τ2 as part of the delay. Thus, the delay offset may be expressed as:

$$\frac{t3 - t1 - \tau 1 - \tau 2}{2}.$$

Figure 8:
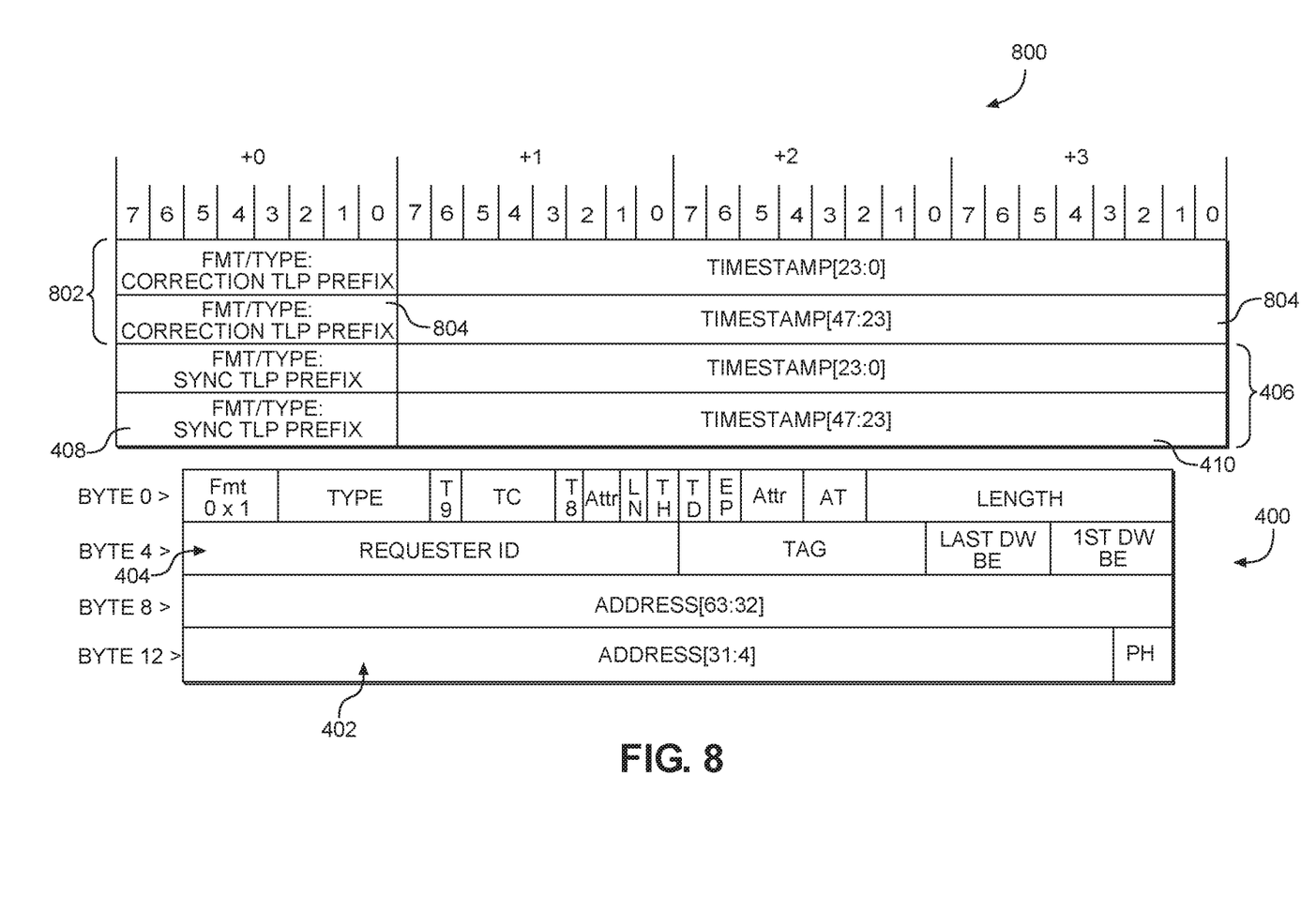
FIG. 8 illustrates an exemplary packet having a correction command prepended thereto.

An exemplary packet 800 having a correction command prepended thereto is illustrated in FIG. 8. The packet 800 includes the PCIE frame 400 of FIG. 4, and a sync command prefix 406 as well as a correction command prefix 802 having a command portion 804 and a time stamp portion 806 that holds τ.

It should be appreciated that the commands of the present disclosure, whether they be sync, delay, or correction may be applied to any outbound packet. In the event that no outbound packet is available in a timely fashion, a zero length write command may be generated and the prefixes prepended. This flexibility allows for reduced signaling relative to PTM techniques.

The time synchronization techniques according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 9:
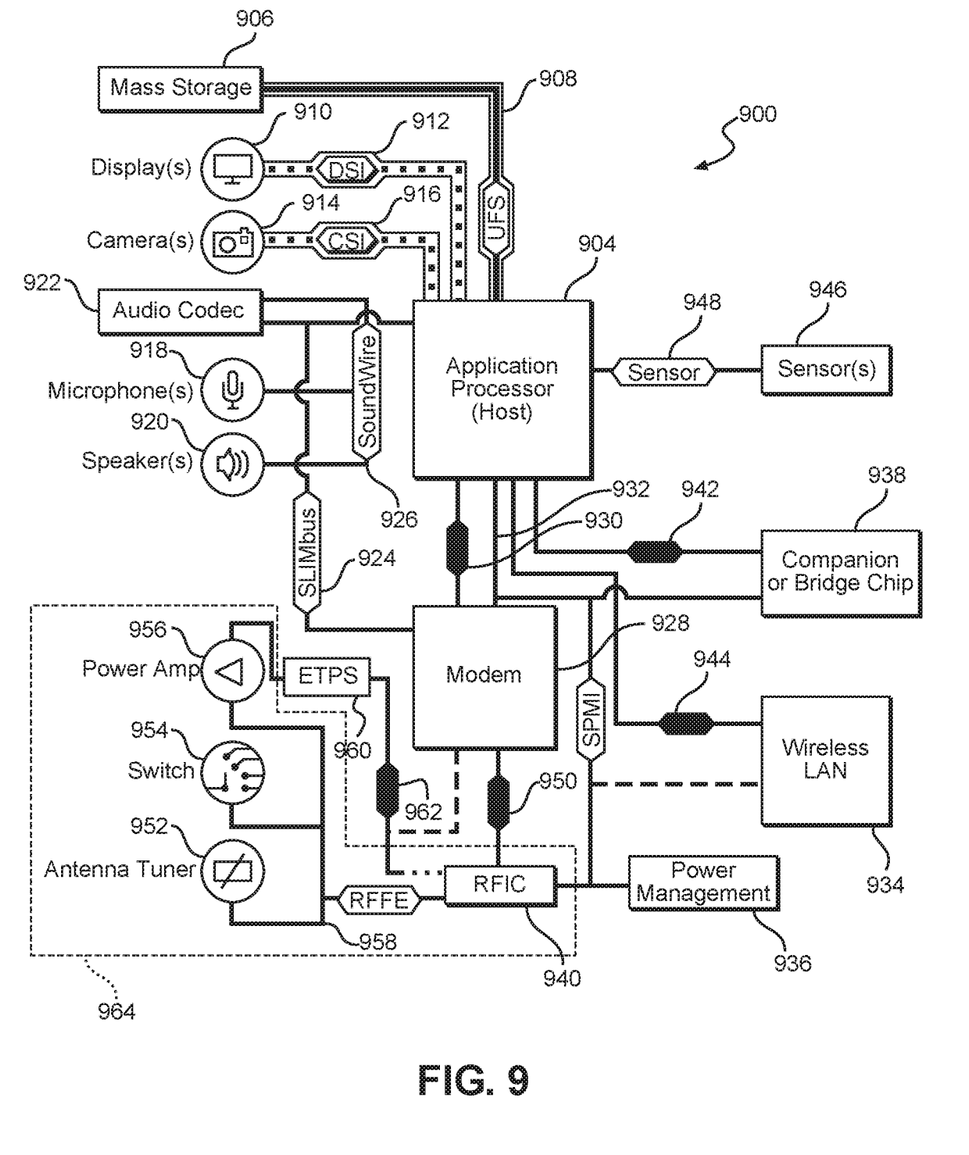
FIG. 9 is a block diagram of an exemplary processor-based system that can include the PCIE links of FIG. 1 and use the processes of FIG. 5.

In this regard, FIG. 9 illustrates an example of a processor-based system 900 that can employ the PCIE system illustrated in FIG. 1 that employs the time synchronization techniques of FIGS. 5-8. In this regard, FIG. 9 is a system-level block diagram of an exemplary mobile terminal 902 such as a smart phone, mobile computing device tablet, or the like.

With continued reference to FIG. 9, the mobile terminal 902 includes an application processor 904 (sometimes referred to as a host) that communicates with a mass storage element 906 through a universal flash storage (UFS) bus 908. The application processor 904 may further be connected to a display 910 through a display serial interface (DSI) bus 912 and a camera 914 through a camera serial interface (CSI) bus 916. Various audio elements such as a microphone 918, a speaker 920, and an audio codec 922 may be coupled to the application processor 904 through a serial low-power interchip multimedia bus (SLIMbus) 924, Additionally, the audio elements may communicate with each other through a SOUNDWIRE bus 926. A modem 928 may also be coupled to the SLIMbus 924 and/or the SOUND-WIRE bus 926. The modem 928 may further be connected to the application processor 904 through a PCI or PCIE link 930 and/or a system power management interface (SPMI) bus 932.

With continued reference to FIG. 9, the SPMI bus 932 may also be coupled to a local area network (WLAN) IC (WLAN IC) 934, a power management integrated circuit (PMIC) 936, a companion IC (sometimes referred to as a bridge chip) 938, and a radio frequency IC (RFIC) 940. It should be appreciated that separate PCI links 942 and 944 may also couple the application processor 904 to the companion IC 938 and the WLAN IC 934. The application processor 904 may further be connected to sensors 946 through a sensor bus 948. The modem 928 and the RFIC 940 may communicate using a bus 950.

With continued reference to FIG. 9, the RFIC 940 may couple to one or more RFFE elements, such as an antenna tuner 952, a switch 954, and a power amplifier 956 through a radio frequency front end (RFFE) bus 958. Additionally, the RFIC 940 may couple to an envelope tracking power supply (ETPS) 960 through a bus 962, and the ETPS 960 may communicate with the power amplifier 956. Collectively, the RFFE elements, including the RFIC 940, may be considered an RITE system 964, It should be appreciated that the RFFE bus 958 may be formed from a clock line and a data line (not illustrated).

Any of the PCIE links 930, 942, and/or 944 may incorporate aspects of the present disclosure.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable RUM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary, aspects herein are described to provide examples and discussion. The operations described may be performed in numerous different sequences other than the illustrated sequences. Furthermore, operations described in a single operational step may actually, be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of synchronizing a clock across a communication link, comprising:
   sending a synchronization command from a master through a Peripheral Component Interconnect (PCI) express (PCIE) link to a slave, wherein the synchronization command comprises a packet prefix and the packet prefix contains a master clock time stamp; and
   receiving a correction command from a bridge on the PCIE link.

2. The method of claim 1, wherein sending the synchronization command comprises prepending a transport layer protocol (TLP) prefix to a TLP frame.

3. The method of claim 1, further comprising receiving a delay command from the slave.

4. The method of claim 3, further comprising, responsive to receiving the delay command, sending a second delay command to the slave.

5. The method of claim 4, wherein sending the second delay command to the slave comprises prepending a prefix to a packet.

6. The method of claim 5, wherein prepending the prefix to the packet comprises prepending a transport layer protocol (TLP) prefix to a TLP packet.

7. The method of claim 4, wherein sending the second delay command comprises sending a second master clock time stamp to the slave with the second delay command.

8. A master device comprising:
   a link interface configured to couple to a Peripheral Component Interconnect (PCI) express (PCIE) link;
   a master clock; and
   a control system operatively coupled to the link interface and the master clock, the control system configured to:
      send a synchronization command to a slave through the PCIE link, wherein the synchronization command comprises a packet prefix and the packet prefix contains a master clock time stamp; and
      receive a correction command from a bridge on the PCIE link.

9. The master device of claim 8, wherein the synchronization command comprises a transport layer protocol (TLP) prefix attached to a TLP frame.

10. The master device of claim 8, wherein the control system is further configured to receive a delay command from the slave.

11. The master device of claim 8, wherein the control system is configured to send a response including the correction command.

12. A slave device comprising:
   a link interface configured to couple to a Peripheral Component Interconnect (PCI) express (PCIE) link;
   a slave clock; and
   a control system operatively coupled to the link interface and the slave clock, the control system configured to:
      receive a synchronization command from a master through the PCIE link, wherein the synchronization command comprises a packet prefix and the packet prefix contains a master clock time stamp; and.
      receive a correction command from a bridge on the PCIE link.

13. The slave device of claim 12, wherein the control system is further configured to update the slave clock based on the master clock time stamp.

14. The slave device of claim 12, wherein the control system is further configured to send a delay command to the master through the PCIE link.

15. The slave device of claim 14, wherein the delay command comprises a prefix prepended to a packet sent to the master.

16. The slave device of claim 14, wherein the control system is configured to receive a second delay command from the master.

17. The slave device of claim 16, wherein the control system is configured to calculate a delay correction based on a time that the delay command was sent and a time that the second delay command was received.

18. The slave device of claim 17, wherein the control system is further configured to correct the slave clock with the delay correction.

19. The slave device of claim 12 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device;
- a wearable computing device; a desktop computer; a personal digital assistant (PDA); a monitor;
- a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *